(12) United States Patent
van den Berg

(10) Patent No.: US 6,371,047 B1
(45) Date of Patent: Apr. 16, 2002

(54) IMPLEMENT FOR FEEDING AND/OR WATERING ANIMALS

(75) Inventor: Karel van den Berg, Bleskensgraaf (NL)

(73) Assignee: Lely Research Holding AH (NL)

( * ) Notice: Subject to any disclaimer, the term of this patent is extended or adjusted under 35 U.S.C. 154(b) by 0 days.

(21) Appl. No.: 09/644,863

(22) Filed: Aug. 24, 2000

Related U.S. Application Data

(63) Continuation of application No. PCT/NL99/00793, filed on Dec. 21, 1999.

(30) Foreign Application Priority Data

| Dec. 24, 1998 | (NL) | 1010898 |
| Apr. 15, 1999 | (NL) | 1011799 |
| May 20, 1999 | (NL) | 1012109 |
| Jul. 2, 1999 | (NL) | 1012504 |

(51) Int. Cl.[7] ............... A01K 5/02; A01K 5/00
(52) U.S. Cl. ............. 119/51.02; 119/52.4; 119/57.5; 119/51.5; 119/61; 119/53; 119/58.1
(58) Field of Search ............... 119/51.5, 51.02, 119/51.03, 51.04, 51.11–14, 52.1, 56.1, 52.4, 53, 53.5, 57.5, 55, 61

(56) References Cited

U.S. PATENT DOCUMENTS 4,735,171 A   4/1988   Essex .................. 119/51.12
5,241,924 A * 9/1993   Lundin et al. ........ 119/51.02

FOREIGN PATENT DOCUMENTS

| EP | 0 272 716 | 6/1988 |
| GB | 2 190 574 | 11/1987 |
| WO | WO 86/01977 | 4/1977 |
| WO | WO 96/05723 | 2/1996 |

* cited by examiner

*Primary Examiner*—Peter M. Poon
*Assistant Examiner*—Floris C Copier
(74) *Attorney, Agent, or Firm*—Penrose Lucas Albright

(57) ABSTRACT

An apparatus for providing consumables such as feed and water to animals, such as cows, which comprises a framework, on which a plurality of troughs are disposed, and a weighing device. The weighing device is provided with at least one weighing unit for selectively weighing the troughs and thus the amount of consumables in each trough. The weighing unit is movable around a central axis along a guide. A drive unit is provided for the weighing unit which may be a stepper motor. The weighing unit also includes a weighing sensor such as a load cell or a strain gauge. An identification sensor identifies the animal at the feeding trough and the weighing device is moved thereto which may weigh the trough to determine the amount of feed or water therein before the animal begins to eat or drink which is taken into account in metering further feed or water to the relevant trough. The weighing device may continue to weigh the feed or drink before, during and/or after the animal eats or drinks from the relevant trough. The amount and nature of the feed or drink or both which the animal receives in the trough is governed by the identification of the animal.

17 Claims, 2 Drawing Sheets

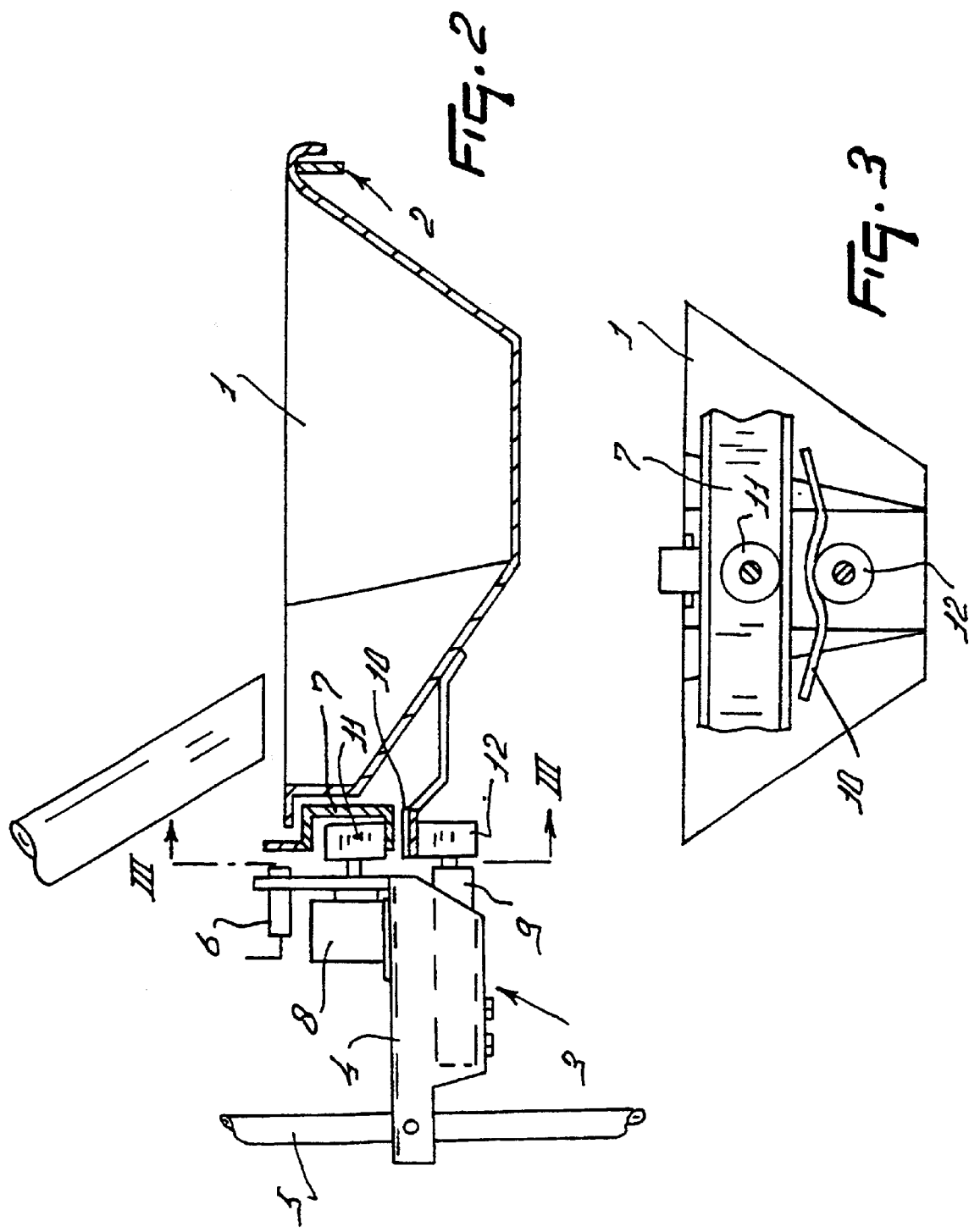

IMPLEMENT FOR FEEDING AND/OR WATERING ANIMALS

RELATED APPLICATION

This Application is a continuation of International Application No. PCT/NL99/00793, filed Dec. 21, 1999.

FIELD OF THE INVENTION

This invention relates to an apparatus for supplying consumable substances comprising feed or water, or both, to a plurality of feeding troughs for animals wherein the amount of feed or water, or both, are weighed by a movable weighing device for weighing the troughs and the material therein.

BACKGROUND OF THE INVENTION

Such Application is described in Dutch Application NL-A-1010898, filed Dec. 24, 1998, in Dutch Application NL-A-1011799, filed Apr. 15, 1999, and a copending Application filed on Aug. 23, 2000 which is a Continuation of International No. PCT/NL99/00792, filed Dec. 21, 1999. Dutch Application NL-A-1010898 discloses column for feeding or drinking or both for animals, such as cows, which is provided with troughs. Application NL-A-1010898 is incorporated by reference in the present Application. Dutch Application NL-A-1011799 discloses a structure for feeding or watering animals or doing both, in which adjacent troughs overlap each other. Such Application NL-A-1011799 is also incorporated by reference in the present Application.

To the constructions described in the aforementioned Applications there may be added a weighing device for weighing the amount of dosed feed and the amount of consumed feed. However, existing weighing devices have the disadvantage of being difficult to integrate into the apparatus disclosed in the aforementioned Applications. Moreover, the existing weighing devices have a complicated construction and are very expensive.

SUMMARY OF THE INVENTION

An object of the instant invention is to obviate the above-mentioned drawbacks by means of an apparatus wherein a metering device supplies feed or drink or both to a feeding trough by means of a weighing device that weighs the trough. In this manner only a few weighing units for weighing a plurality of troughs are required. According to an inventive feature, the apparatus is provided with a control unit for controlling the weighing device. The control unit is also adapted for processing the weighing data. According to again another inventive feature, the apparatus is provided with identification means which are disposed in the vicinity of the trough and by means of which an animal is identified and the control unit is activated. The weighing device is provided with at least one displacing device with the drive unit, such as a stepper motor, for displacing the weighing unit.

In a preferred embodiment the weighing device comprises a central axis around which the weighing unit is rotatably disposed. The position of the weighing unit relative to the troughs is determined by means of one or more positioning sensors with which the weighing unit is provided.

According to another inventive feature, the framework is provided with a guide means, such as a rail or a groove, and a guide element, such as a wheel or a toothed wheel, for guiding the weighing unit along the troughs. When the guide element consists of a toothed wheel, there is preferably provided a toothing on the guide means. The weighing device preferably comprises one or more drive units for displacing the weighing unit. When the drive unit consists of a stepper motor, a positioning sensor for establishing the position of the weighing unit relative to the trough is not required.

The weighing unit is preferably provided with a weighing sensor, such as a load cell or a strain gauge, for registering data comprising the weight or at least part of the weight of the trough. In practice a load cell appears to be most satisfactory for establishing the weight of the trough in an inexpensive and accurate manner.

According to a further inventive feature, the apparatus is provided with a control unit for displacing the weighing unit.

The above-described apparatus operates according to the following method. An animal located in the vicinity of a relevant trough is identified with the aid of the identification means.

The weighing unit is subsequently moved towards the relevant trough, whereupon feed or drink or both are supplied to the trough by means of the metering device, while the trough is being weighed during or after metering or at both times. In this manner it is possible to determine the amount of feed in the trough during or after metering.

In accordance with another method, by means of the control unit the amount of feed or drink or both in the relevant trough is determined during the supply of feed or drink or both to the relevant trough, immediately after the supply of feed or drink or both to the relevant trough or at both times, or during the time when the animal is eating, or after the animal has moved away from the relevant trough or a combination thereof. In this manner, it is possible to establish the amount of feed consumed by an animal. Moreover, it is possible to analyze the animal's eating behavior and to draw conclusions, on the basis thereof, concerning the animal's condition. For example, the time it takes for animal empty the relevant trough may be an indication of the animal's health.

According to a further method, by means of the control unit the remaining amount of feed or drink or both is determined for the relevant trough before the feed or drink or both are again supplied to the relevant trough, the amount of feed or drink or both supplied to the relevant trough thus depending on the remaining amount of feed or drink or both so determined. In practice it occurs that an animal does not empty the relevant trough completely. In this situation, the remaining feed or drink or both in the relevant trough can be consumed by the next animal, so that it is possible to dose less feed or drink or both to the relevant trough. In practice this provides a considerable saving of the amount of feed or drink or both which are supplied to such trough

BRIEF DESCRIPTION OF THE DRAWINGS

The invention will now be explained in further detail with reference to the following Figures:

FIG. 2 is a cross-sectional elevational view of FIG. 1 taken on section line II—II of FIG. 1, and FIG. 3 is a cross-sectional view of FIG. 2 taken on section line III—III of FIG. 2.

DETAILED DESCRIPTION OF THE PREFERRED EMBODIMENTS

Figure 1:
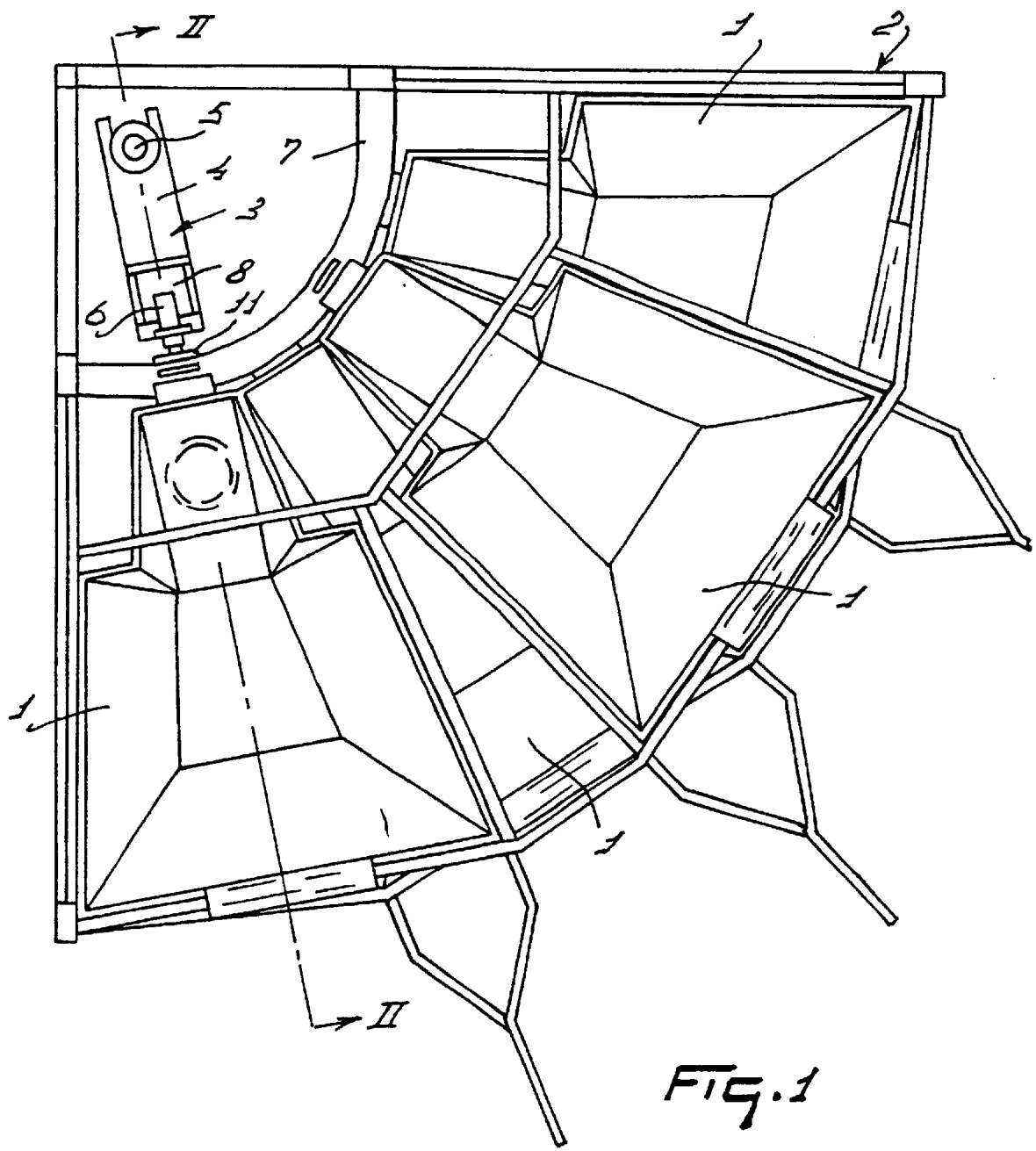
FIG. 1 is a plan view of an apparatus for feeding or watering animals or doing both which apparatus is provided with a weighing device.

As mentioned above, an apparatus for feeding or watering animals or doing both is described in Dutch Application NL-A-1010898. The apparatus comprises troughs 1 which are disposed in a framework 2. A weighing unit 4 for weighing the troughs 1 is rotatably disposed relative to a central vertical axis 5. The framework is provided with a guide means 7 for guiding weighing unit 4. Weighing unit 4 is moved along guide means 7 by means of a drive unit 8. The position of weighing unit 4 relative to trough 1 is determined by means of a positioning sensor 6. This sensor may be constituted by a proximity switch, an ultrasonic sensor or the light sensor.

FIG. 2 is a cross-sectional view of a detail of the apparatus in FIG. 1. Weighing unit 4 is hingeably disposed relative to central axis 5 for a shaft or axle and rests on guide means 7 by means of a wheel 11 driven by drive unit 8. Trough 1 is provided with a bracket 10 by means of which the trough is lifted, such that part of the weight of the trough rests on a roller 12 which is connected to a weighing sensor 9. Because of the fact that less than the entire weight rests on the weighing sensor, the weighing data should be processed to determine the correct position of weighing unit 4 relative to the trough to be weighted. When guide means is provided with teeth, a stepper motor can be used as a drive in drive unit 8. In that case, the determination of the position of the weighing unit relative to the trough can be omitted.

FIG. 3 shows a cross-sectional detail of FIG. 2 taken on section lines III—III of FIG. 2. Bracket 10 for lifting the trough is provided with curves as a result of which roller 12 of the weighing unit 4 can easily lift trough 1.

Although I have disclosed the preferred embodiments of my invention, it will be understood by those skilled in the art that it is adaptable of other adaptations and modifications within the scope of the following claims.

What is claimed is:

1. An apparatus for providing consumable substances to animals which comprises a framework, a plurality of troughs disposed on said framework, a metering device for supplying said substances to a relevant trough, a weighing device for weighing the amount of said substances, said weighing device being provided with at least one movable weighing unit for selectively weighing said troughs and with at least one displacing device having a drive unit for displacing said weighing unit.

2. An apparatus in accordance with claim 1, wherein said drive unit compromises a stepper motor.

3. An apparatus in accordance with claim 1, comprising a control unit for controlling said weighing device.

4. An apparatus in accordance with claim 3, comprising identification means in the vicinity of each of said relevant troughs whereby an animal at each of said relevant troughs is identified and said control unit is activated.

5. An apparatus for providing consumable substances to animals which comprises a framework, a plurality of troughs disposed on said framework, a metering device for supplying said substances to a relevant trough, a weighing device for weighing the amount of said substances, said weighing device being provided with at least one movable weighing unit for selectively weighing said troughs, said weighing device comprising a fixed vertical central axis, said weighing unit being rotatably disposed relative to said fixed vertical central axis.

6. An apparatus for providing consumable substances to animals which comprises a framework, a plurality of troughs disposed on said framework, a metering device for supplying said substances to a relevant trough, a weighing device for weighing the amount of said substances, said weighing device being provided with at least one movable weighing unit for selectively weighing said troughs and at least one positioning sensor to determine the position of said weighing unit relative to said plurality of troughs.

7. An apparatus for providing consumable substances to animals which comprises a framework, a plurality of troughs disposed on said framework, a metering device for supplying said substances to a relevant trough, a weighing device for weighing the amount of said substances, said weighing device being provided with at least one movable weighing unit for selectively weighing said troughs, said framework being provided with guide means and a guide element for guiding said weighing unit along said plurality of troughs.

8. An apparatus in accordance with claim 7, wherein said guide means comprises a rail.

9. An apparatus in accordance with claim 7, wherein said guide means comprises a groove.

10. An apparatus in accordance with claim 7, wherein said guide element comprises a wheel.

11. An apparatus in accordance with claim 10, wherein said wheel comprises a toothed wheel.

12. A method of providing a consumable substance to animals in a relevant trough of a plurality of adjacent troughs, the method comprising the steps of automatically identifying an animal located in the vicinity of a said relevant trough with the aid of identification means, automatically moving a weighing unit towards said relevant trough, automatically supplying said substance to said relevant trough by means of a metering device, and automatically weighing said substance in said relevant trough.

13. A method in accordance with claim 12, wherein by means of a control unit the amount of said substance in said relevant trough is determined during the supplying of said substance to said relevant trough.

14. A method in accordance with claim 12, wherein by means of a control unit the amount of said substance in said relevant trough is determined immediately after the supply of said substance to said relevant trough.

15. A method in accordance with claim 12, wherein by means of a control unit the amount of said substance in said relevant trough is determined when the animal is consuming said substance from said relevant trough.

16. A method in accordance with claim 12, wherein by means of a control unit the amount of said substance in said relevant trough is determined after the animal has moved away from said relevant trough.

17. A method in accordance with claim 12, wherein by means of a control unit the amount of said substance remaining in said relevant trough after an animal has consumed substance therefrom is determined and taken into account in metering further substance for the next animal that comes to said relevant trough to consume substance therefrom.

* * * * *